(No Model.) 3 Sheets—Sheet 1.
J. H. BAKER.
WAGON RUNNING GEAR.
No. 480,380. Patented Aug. 9, 1892.
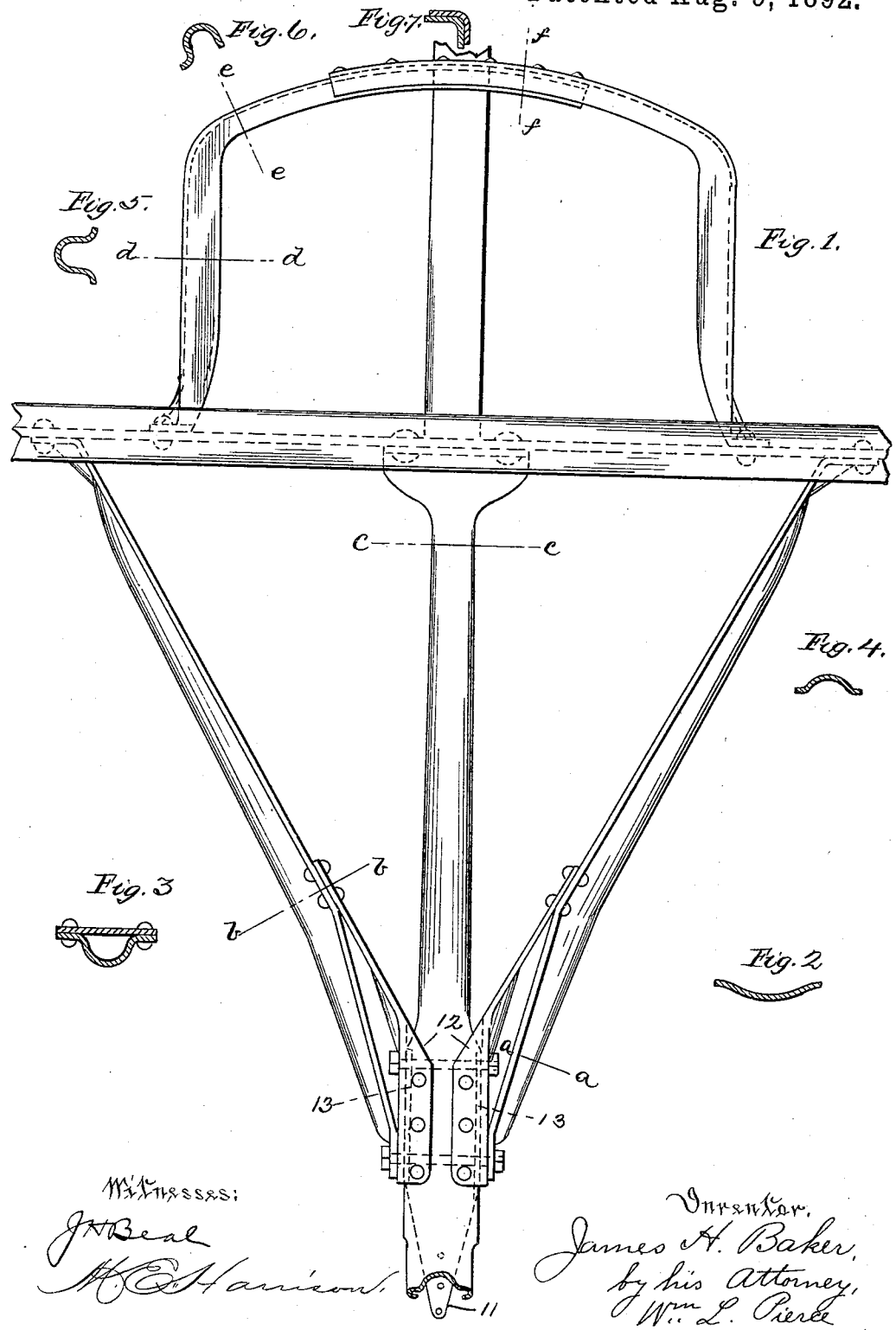

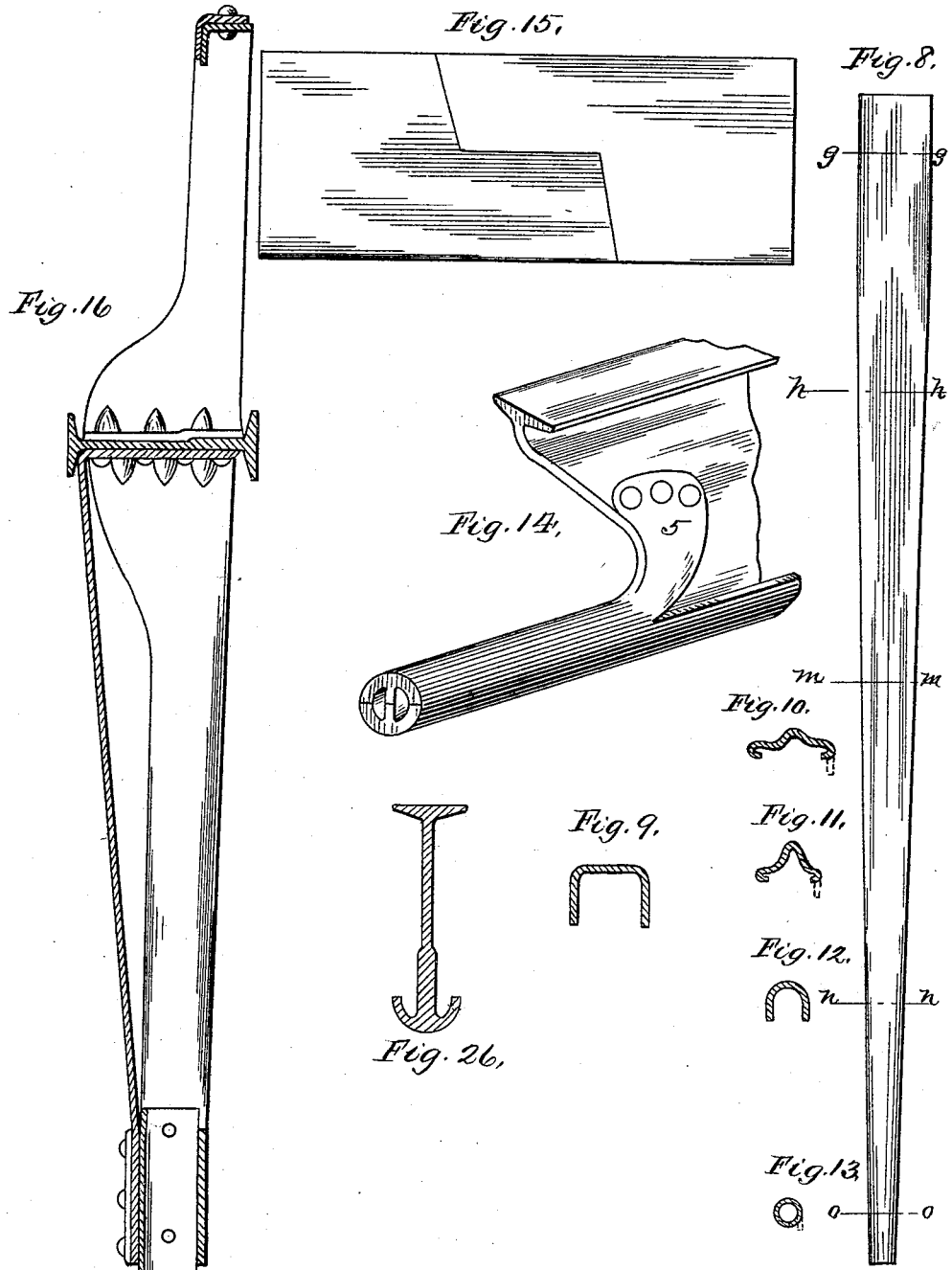

(No Model.) 3 Sheets—Sheet 3.
J. H. BAKER.
WAGON RUNNING GEAR.
No. 480,380. Patented Aug. 9, 1892.
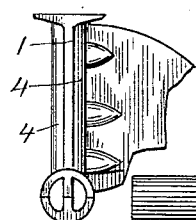
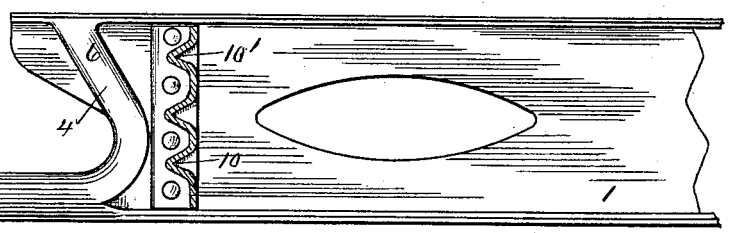
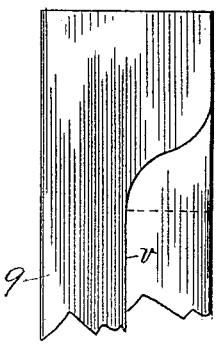
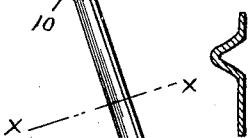
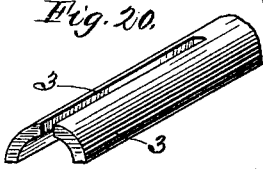
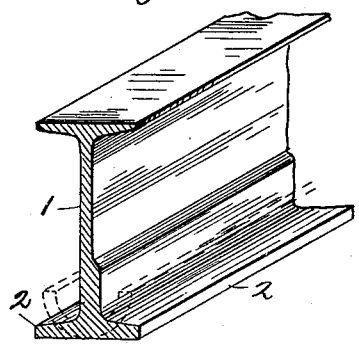
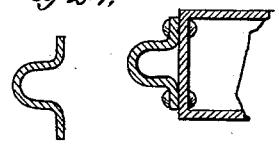
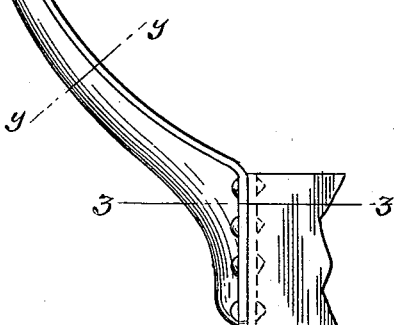
Witnesses:
J H Beal
M E Harrison
Inventor,
James H. Baker
by his Attorney,
Wm L. Pierce

UNITED STATES PATENT OFFICE.

JAMES H. BAKER, OF ALLEGHENY, PENNSYLVANIA.

WAGON RUNNING-GEAR.

SPECIFICATION forming part of Letters Patent No. 480,380, dated August 9, 1892.

Application filed March 28, 1892. Serial No. 426,681. (No model.)

*To all whom it may concern:*

Be it known that I, JAMES H. BAKER, a citizen of the United States, residing at Allegheny, in the county of Allegheny and State of Pennsylvania, have invented or discovered new and useful Improvements in Wagon Running-Gears, of which the following is a specification.

In the accompanying drawings, which make part of this specification, Figure 1 is a plan view of the tongue broken off, braces, reach, front axle, front hounds, and combined front hounds and slider. Fig. 2 is a section of a front hound on line $a\,a$ of Fig. 1. Fig. 3 is a like view on line $b\,b$; Fig. 4, a section of the brace on line $c\,c$; Figs. 5, 6, and 7, sections of the combined front hounds and slider on lines $d\,d$, $e\,e$, and $f\,f$, respectively. Fig. 8 is a plan view of the tongue; and Figs. 9 to 13, sections of same on lines $g\,g$, $h\,h$, $m\,m$, $n\,n$, and $o\,o$, respectively; Fig. 14, a perspective, broken off, of the combined axle and bolster, showing the web reinforced by rivetting. Fig. 15 is a plan showing blank from which two connecting-pieces for joining the hounds and tongue are cut, the lines of cut also being shown. Fig. 16 is a side elevation, partly in section, of Fig. 1. Fig. 17 is a front elevation of the axle and bolster broken off, with corrugations in section. Fig. 18 is an end view of same. Fig. 19 is a perspective of blank from which axle and bolster is made, showing in dotted lines the lower flanges turned up to form a half-circle. Fig. 20 is a perspective, broken away, of the axle-cap. Fig. 21 is a plan of the blank broken away, from which I cut two hounds. Fig. 22 is a plan, broken off of a hind axle and hound. Fig. 23 is a section on line $x\,x$ of Fig. 22; Fig. 24, a section on line $y\,y$ of same; Fig. 25, a section on line $z\,z$ of same; and Fig. 26 is a section through the bolster-web and axle between the arms.

My invention relates to improvements in metallic axles and bolsters, hounds, and tongues in what are generally known as "farm" and "lumber" wagons.

Previous to my invention metal hounds were made of rectangular, square, round, angle, or any other shapes in cross-section, such as are produced in rolling-mills. These rolled sections are highly objectionable in the manufacture of hounds, as they are necessarily of uniform shape and weight, while the strain on wagon hounds and tongues varies both in amount and direction at different points. Consequently the rolled hounds and tongues have much extra weight where not needed and lack it at the points where the greatest strains come. Attempts have been made to remedy this weakness by extra braces; but this uniformity in rolled shapes has almost wholly prevented the use of metal in wagon-tongues.

The objects of my present invention are to do away with rolled sections in the manufacture of hounds and tongues by substituting cut and pressed shapes, so as to need no extra pieces in the way of bracing; also, to put the least possible amount of metal in that part of the axle which lies between the arms, and finally to make a metallic axle and bolster in one piece.

Fig. 19 is a section showing the form of the blank 1, from which the axle and bolster is made. Then by means of suitable dies in a press I turn up the edges of the axle at flanges 2 2, so as to form the lower side of the arm. I then take a piece like that shown in Fig. 20 and cut it at 3 3 and place it in a die and bend these ends to the shapes 4 4. (Seen in Fig. 17.) I then weld this piece on the axle, preferably along the lines, turned up into a half-circle. The piece thus forming the upper half of the arm is carried in two parts backward and upward toward the top of the bolster, where I fasten them either by riveting, as seen in Fig. 14, at 5, or welding, as seen in Fig. 17, at 6. In some cases, as when the bolster is low and the web thick, the reinforcements may be run straight back along the web without extending upward. They may be fastened from where they leave the lower half of the arm up to their ends; but to get elasticity I prefer to fasten them only at the top by welding. The bend 7 in these extensions may be thrown much farther back than I have shown them, in order to lengthen that part of the arm behind the wheel, so as to secure the distribution of the strain. The extension of this piece and the reach attachment in the center render unnecessary end flanges or stiffening-ribs in the web, which I have used in other forms of metallic axle and bolster. The arms I taper in the usual way. The web I make with increased thickness next to the axle, as the central part of the axle is very light, and so that I may give vertical strength to the arms. By "increased thickness" I do not mean merely the fillet which it is common to roll in the corners of metal joining at an angle, but substantially such an increase as is shown in Figs. 16 and 19.

In making the hind hounds I take a piece of metal, preferably steel, in a flat bar of suitable thickness and cut it into pieces 9 9, as shown at lines v v in Fig. 21. These shapes will vary some for different forms of wagons. The thickness best suited to a given size of wagon will be found to be less than that of rolled shapes, owing to the peculiar shape, hereinafter to be explained. The main thing is that by my plan of cutting and pressing I get the extra strength where and in the direction it is most needed. I heat the pieces and place them in suitable dies in a press, which can be made by ordinary skill, and I thus shape them both in cross-section and lengthwise. There will be some trimming to be done at the ends of the hounds so formed. This and punching the holes for the web should be done after the hounds have been formed. I make the shape of the cross-section to vary and gradually change in form, as seen in Figs. 23, 24, and 25, to meet the changing lines of strain developed by use. Where the hounds join the axle and bolster by a turn at a sharp angle, I press in the corner-braces 10 10. At the point where the hounds join the reach I adapt their shape to suit any desirable shape of reach or reach-plate.

Having shown how I make the hind hounds, Figs. 1 and 16 will clearly show how to make the front hounds both for those on the forward part of the axle and those for the rearward part of the axle. These last also join or are connected with the slider, which I call, for distinction, the "front" hounds and slider, as it will be seen from Fig. 1 that I do not make my metal hounds to extend in one piece each from the tongue through and between the axle and bolster, as is usually done with wooden ones.

The front hounds can be changed in shape to suit the common shapes of tongues. It will be obvious to one skilled in the art that as the back end of wagon-tongues are usually reinforced by brackets, or what are sometimes called "tongue-hounds," made of either metal or wood, my front hounds can be made to fit said brackets or tongue-hounds. If a falling tongue is used, the back ends can be shaped to receive or be made into an eye or boss, such as is used generally on shafts or drop-tongues. In such case the extra strength at the back ends will be thrown to and extend back from the front ends. When a stiff or half-stiff tongue is made, a support such as 11 or some common form may be used. The pieces 12 12 I use to get a bearing for the tongue and to avoid too sharp an angle in the hounds. These for some forms of construction may be omitted or may be used in other forms; but I find this to be the best position in which to use them.

In making the front hounds and slider I pursue the same plan as explained for making the hind hounds; but from Figs. 5, 6, and 7 it will be seen that the changes in the shape of other cross-section is a little more marked. This I do to get an extra-heavy wearing-surface and also greater strength at that part of the slider where the reach works upon it. Having cut, pressed, trimmed, and punched the hounds and the slider or ends, which are parts of the same pieces, I fasten them together by rivets. For some constructions they can be welded. When any of these hounds are to be joined to metallic axles and bolsters, they should be riveted in hot by hydraulic or compressed-air riveting-machines; but when putting them on wooden axles or bolsters it is better to bolt them fast.

In making my metallic tongue I take a piece of thin metal large enough to make two tongues and split it, to save scrap, along a diagonal line, according to the taper wanted. I heat it and place in a press between a pair of dies suited in shape. The closing of the dies gives the shapes as shown at Fig. 9 and the dotted lines of Figs. 10 to 12 in the different parts, and of course the varying shapes from one point to another. I then move the piece to another form in the die, and the next motion of the press turns the edges as seen in full lines in Figs. 10 and 11, and the end as seen in full lines at Fig. 13, and furnishes the press-work. I then form a piece 13 and rivet it on the lower side of the back end of the tongue, as shown in dotted lines in Fig. 1, so as to reinforce the tongue-bolt hole and stiffen the tongue at the back end, as I have necessarily changed its form of cross-section from its strongest shape in order to give bearing-surfaces for the hounds and doubletree. All the pressing can be done better in hydraulic machines. The particular cross-sections of hounds and tongue shown, while I believe them to be best, are by no means the only sections possible, but may be greatly varied, provided the extra strength is thrown at or about the points I have indicated.

The advantages of my invention are, among others, that I get the most lateral strength in the axle with a given amount of metal, while the vertical strength is given by the bolster and the connecting-web and a strong arm without too much rigidity. In the hounds I get the desired extra strength at the points where it is needed and save weight where it is useless, which cannot be done by using rolled sections of uniform shape and weight.

It is easily seen that if hounds were no stronger vertically where they join the axle than they are in their body they would not stand common use without being reinforced by braces, and it is equally clear that if they were of no stronger shape laterally at section 22 of Fig. 22 than in their body they would not stand use. By cutting the two out of one piece, as seen at Fig. 21, I secure the extra metal without waste, and by pressing into the varied shape, as explained, I get the greatest amount of working strength at a reduced cost, for it costs more to roll angle and channel shapes, &c., than plain flats, and after they are rolled they have to be welded to or otherwise fitted up at the ends and be shaped up lengthwise and then braces be added. Again, in the front hounds and slider I get the best slider and strongest hounds from a given weight. In the tongue I get the desired taper and in every way a stronger and cheaper one than can be made from metal of a uniform shape and weight without pressing.

I claim—

1. In a wagon, a metallic axle and bolster in one piece having the arms made heavier than the balance of the axle and provided with reinforcements extending to the web, substantially as set forth.

2. In a wagon, a metallic axle and bolster in one piece having the web connecting them thicker next the axle than in the balance of the web, substantially as set forth.

3. Pressed metallic hounds for a wagon, having increased strength imparted to them in a vertical direction at the point where they join the axle and bolster by increasing there the vertical depth of the section of said hounds.

4. Pressed metallic hounds for a wagon, having increased strength imparted to them in a horizontal plane at the point where they join each other by increasing their horizontal section there.

5. In a wagon, pressed metallic combined hounds and slider having increased thickness at the place where the reach works upon the slider, substantially as set forth.

6. A pressed metallic tongue for a wagon, the cross-section of which at the rear end is shallow vertically and wide horizontally, said section gradually changing into a circle at the front end, said tongue also having a longitudinal tapering corrugation extending from the rear end nearly to the front end.

In testimony whereof I have hereunto set my hand this 23d day of March, A. D. 1892.

JAMES H. BAKER.

Witnesses:
WILLIAM BEAL,
WM. L. PIERCE.